S. MARTIN.
POTATO-DIGGER.

No. 181,193. Patented Aug. 15, 1876.

Witnesses.
John Grist,
John. S. Grist,

Inventor
S. Martin
By Henry Grist
Attorney.

UNITED STATES PATENT OFFICE.

STEPHEN MARTIN, OF NORTH GOWER TOWNSHIP, CARLETON COUNTY, ONTARIO, CANADA.

IMPROVEMENT IN POTATO-DIGGERS.

Specification forming part of Letters Patent No. 181,193, dated August 15, 1876; application filed May 17, 1876.

*To all whom it may concern:*

Be it known that I, STEPHEN MARTIN, of the township of North Gower, in the county of Carleton, in the Province of Ontario, in the Dominion of Canada, have invented certain new and useful Improvements in Potato-Diggers; and I do hereby declare that the following is a full, clear, and exact description of the same.

This invention has for its object to remove the unfruitful soil from both sides, laterally, while the fruitful soil is raised by a plow-point on a rotating apron, and in providing such construction with rotary arms to break the soil entering on the apron, and a valve opening upwardly, to carry the soil from plow-point to apron, and to prevent stones and other hard substances carried by the return of the apron from breaking the machine at the space bridged by the valve.

Figure 1:
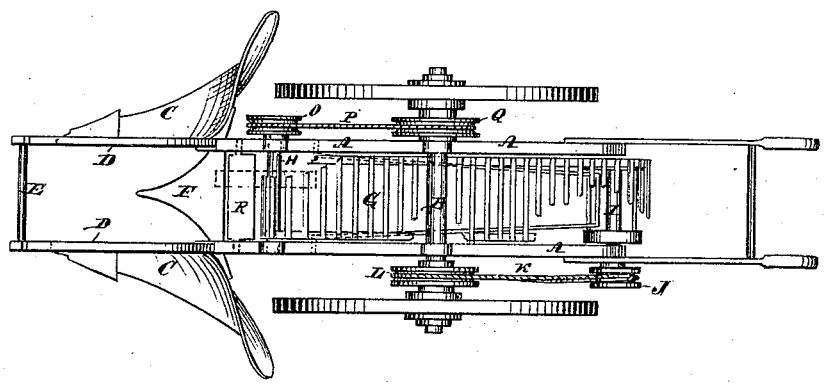
Figure 2:
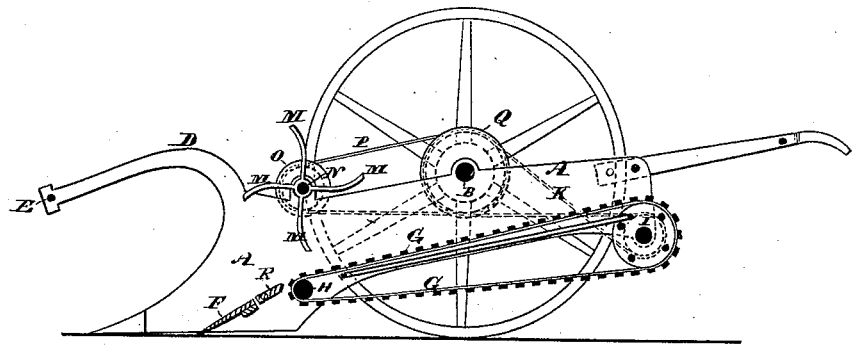

Figure 1 is a top view of the machine, and Fig. 2 is a longitudinal vertical section of the same.

A A are the parallel longitudinal sides of the main frame, carried by and below the axle B of the ground-wheels, and both of the sides A A, forwardly, have mold-boards C C, to throw the soil laterally clear of the line of draft, and plow-beams D D, connected at front by the draft-bar E or other contrivance. F is a plow-point, fixed between the sides A A in an inclined position, the point of the plow being in the plane of the ground-wheels and the sole-plate of the mold-boards. G is an apron, operating between the sides A A, from near the point F to the rear extremity of the machine. Forwardly, the apron bears on a rotary shaft, H, and rearwardly by a shaft, I, which is driven by a pulley, J, on the end thereof, having a band, K, passing over a wheel, L, keyed on the axle B. M are radial blades on a shaft, N, driven by the pulley O, band P, and wheel Q on the axle B. R is a flap-valve, opening upwardly, and pivoted in the sides A A, between the point F and apron-shaft H, to pass the soil from the point F to the apron, and at the same time preventing stones, &c., lodging in the apron breaking the machine by forcing a passage, were the point and apron in close proximity unbridged by the valve.

The unfruitful soil is thrown laterally from the track of the machine by two mold-boards, C C, and at the same time the fruitful soil is lifted by the point F and broken by the rotary blades M in its passage over the valve R to the apron, which has meshes of suitable size to retain the potatoes and allow the soil to pass through, the potatoes, by the rotation of the apron being conveyed to the rear, where they fall into a receptacle or to the ground, as may be desired.

I claim as my invention—

1. The combination of the parallel sides A A, having mold-boards C C, the intermediate plow-point F, and apron G, and the rotatory blades M, driven from the axle B by the band and pulley devices, as described.

2. The flap-valve R, opening upwardly, pivoted to the sides A A between the point F and apron G, as and for the purpose set forth.

STEPHEN MARTIN.

Witnesses:
JOHN GRIST,
JOHN S. GRIST.